US007062280B2

(12) United States Patent
Kangas et al.

(10) Patent No.: US 7,062,280 B2
(45) Date of Patent: Jun. 13, 2006

(54) SPACE IDENTIFICATION SYSTEM

(75) Inventors: Petri Kangas, Oulu (FI); Jani Mäntyjärvi, Espoo (FI); Sami Sillanpää, Helsinki (FI); Antti Takaluoma, Ii (FI); Kari Kangas, Oulu (FI); Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 10/183,314

(22) Filed: Jun. 25, 2002

(65) Prior Publication Data

US 2003/0013505 A1 Jan. 16, 2003

(30) Foreign Application Priority Data

Jun. 28, 2001 (FI) ................................. 20011383

(51) Int. Cl.
*H04Q 7/20* (2006.01)

(52) U.S. Cl. ................... 455/456.4; 455/418; 455/419; 455/420; 340/572.1; 340/825.49; 398/106; 398/111; 398/172

(58) Field of Classification Search ............. 455/456.4, 455/418, 419, 420, 41.2, 41.3, 88, 403; 340/572.1, 340/825.49; 315/151, 152, 153, 154; 398/106, 398/111, 172
See application file for complete search history.

(56) References Cited

U.S. PATENT DOCUMENTS 5,900,826 A * 5/1999 Farber ........................ 340/908
6,271,815 B1 * 8/2001 Yang et al. .................... 345/82
6,366,863 B1 * 4/2002 Bye et al. ...................... 702/57
6,421,544 B1 * 7/2002 Sawada ...................... 455/565
6,445,142 B1 * 9/2002 Xia et al. .................. 315/307

FOREIGN PATENT DOCUMENTS

| | | | |
|---|---|---|---|
| DE | 197 44 263 | C1 | 5/1999 |
| DE | 198 31627 | A1 | 1/2000 |
| DE | 198 32633 | A1 | 1/2000 |
| DE | 198 59264 | A1 | 6/2000 |
| EP | 0 891 110 | A1 | 1/1999 |
| EP | 1 164 808 | A1 | 12/2001 |
| FR | 2 775 862 | A1 | 9/1999 |
| JP | 10-234080 | | 9/1998 |
| WO | WO-01/15351 | A1 | 3/2001 |

* cited by examiner

OTHER PUBLICATIONS

Al-Kazily et al, "Automatic Service to Control Cell Phone", Dec. 2000, Research Disclosure, 1 pg.

*Primary Examiner*—Lee Nguyen
*Assistant Examiner*—Sanh Phu
(74) *Attorney, Agent, or Firm*—Harrington & Smith, LLP

(57) ABSTRACT

System and method for identifying various types of room facilities to find out and take into account space information. A tag of a space (S2) is included in the fluctuation of the intensity of the light emitted by a lamp (LF1) provided in the space in question. The receivers included in the system are arranged e.g. in commercial mobile stations (R1). These are provided with a light detector and with a DSP algorithm that analyses the signal given by said light detector. As a result of the analysis, for instance the mobile station is automatically switched off when entering the space in question. There is neither needed a separate transmitter nor separate energy supply arrangements to send the space tag, and the space tag signal can be detected throughout said space. As regards the mobile station, the space-specific operations can be performed automatically, so that the mobile station user does not need to bother, and his possible negligence does not prevent the precautions from being executed.

12 Claims, 4 Drawing Sheets

SPACE IDENTIFICATION SYSTEM

FIELD OF THE INVENTION

The invention relates to a system for identifying various types of room facilities in order to find out and take into account information of a current space. The invention also relates to a method for finding out and taking into account the relevant space information of the space.

BACKGROUND OF THE INVENTION

In many public premises and such private premises where visitors have a fairly free access, there are spaces that require a certain type of behavior of the visitor. Among these spaces are for instance hospital treatment rooms and conference rooms in various institutes and enterprises. The behavioral requirements often relate to a mobile station and mean that the mobile station should be switched off or at least the ringing tone should be set to silent. It could be advisable to provide, for a person entering the room, at least an automatic notice of the recommendable behavior in the space in question. One possibility is simply to give a notice that the person has entered a certain room, without any specific instructions.

In the prior art there are known systems, based on different principles that are used for automatic space identification. They include a transmitter arranged in the space in question and a receiver that the user carries with him. The transmitter keeps sending a space identifier or tag signal, and a receiver that is located within the coverage of the transmitter detects the space tag and displays it in some form. The transmitter may represent the infrared type, in which case the intensity of the IR radiation is modulated by the space tag signal. FIG. 1 shows an example of this kind of solution. In the figure there is seen a conference room S1, on the rear wall whereof there is a tag transmitter 110. At the door of the room, a person M1 has arrived holding a receiver 120 in his hand. The infrared ray IRR from the transmitter 110 hits the receiver, which gives a sound alarm and for instance informs, in text form on the display, what is the nature of the space in question. A drawback with a system that uses infrared transmission is that the beam of the ray from the transmitter is fairly narrow, wherefore the transmitter is far from reaching a receiver in all spots throughout the space in question. The use of several transmitters can alleviate the problem, but this increases the expenses of the system.

The transmitter may also be a radio transmitter, in which case the radio carrier is modulated by the space tag signal. In that case the drawback is that the transmission easily proceeds to adjacent spaces, and the danger of erroneous messages is obvious. In addition, the devices are more expensive than infrared equipment. Moreover, the transmission can be realized purely inductively. The drawback of such a system is that in practice the range of an inductive transmitter remains within a few meters.

A common drawback with the described systems is that they require an installation of the transmitter and an arrangement of a power supply for the transmitter. In FIG. 1, power supply is represented by the cable 115. Moreover, the systems are unpractical because their use means that a receiver must be given to all persons entering from outside.

The object of the invention is to alleviate the described drawbacks connected to the prior art. The system according to the invention is characterized in what is set forth in the independent claim 1. The method according to the invention is characterized in what is set forth in the independent claim 11. Some preferred embodiments are described in the rest of the claims.

SUMMARY OF THE INVENTION

The basic idea of the invention is the following: the space tag information is included in the intensity fluctuation of the illumination of the space. For instance frequency converters are used in illuminators, so that in separate spaces of a certain building, the frequency of the supply current in the lamps is different. The receiver is advantageously arranged in commercial mobile stations. These are provided with a light detector and advantageously with a DSP (digital signal processing) algorithm for analyzing the signal given by said detector. On the basis of the result of the analysis, a mobile station is instance switched off automatically when entering a space.

It is an advantage of the invention that neither a separate transmitter nor separate energy supply arrangements are needed for sending the space tag. Another advantage of the invention is that the space tag signal can be detected throughout said space. Another advantage of the invention is that the space tag signal cannot be detected in adjacent spaces, because the light that carries the signal does not penetrate the walls in between. Another advantage of the invention is that when a mobile station is used as a receiver, nearly all visitors carry one permanently along, in which case a separate receiver is not needed. Moreover, an advantage of the invention is that in a mobile station, all space-specific operations can be arranged automatically, in which case the mobile station user does not have to bother, and his possible negligence does not prevent the precautions from being executed.

BRIEF DESCRIPTION OF THE DRAWINGS

The invention is described in more detail below. The description refers to the appended drawings, where.

DETAILED DESCRIPTION OF THE INVENTION

Figure 1:
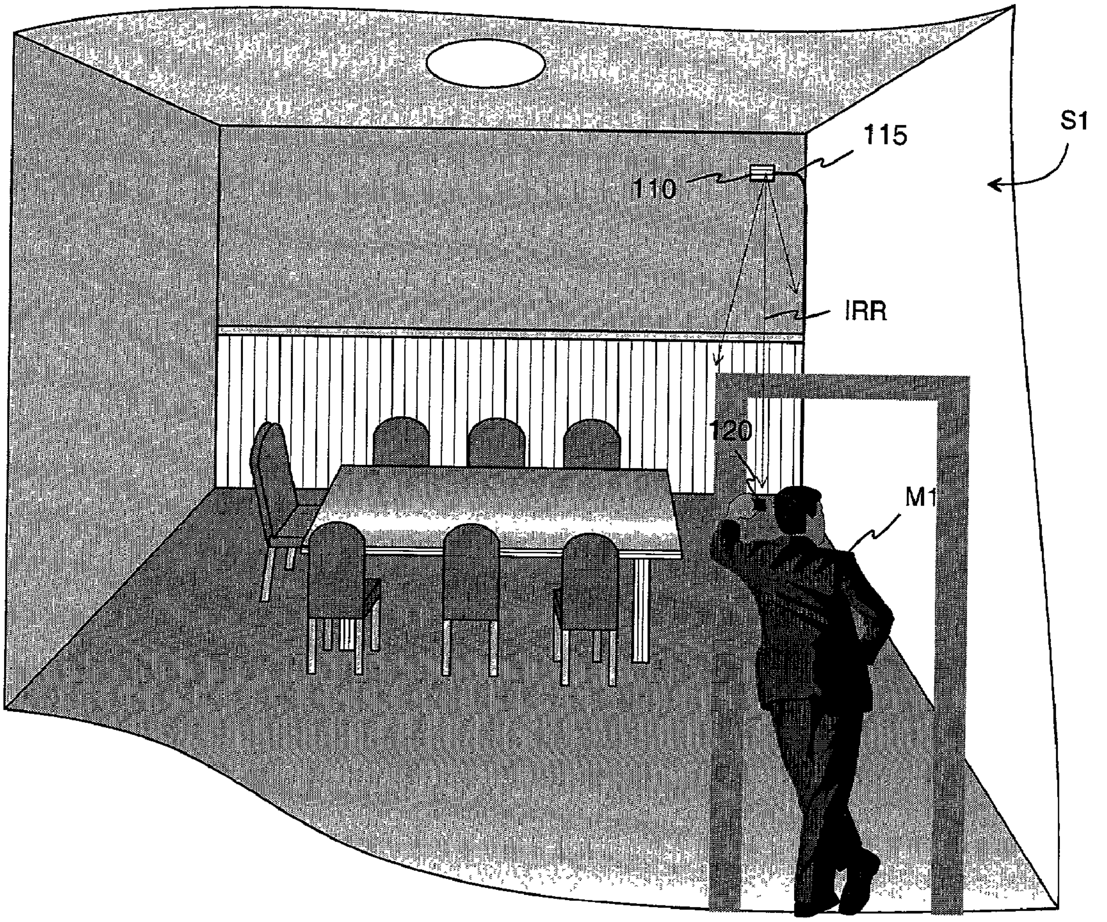
Fig. 1 PRIOR ART
FIG. 1 illustrates an example of a prior art system.

FIG. 1 was already dealt with in connection with the description of the prior art.

Figure 2:
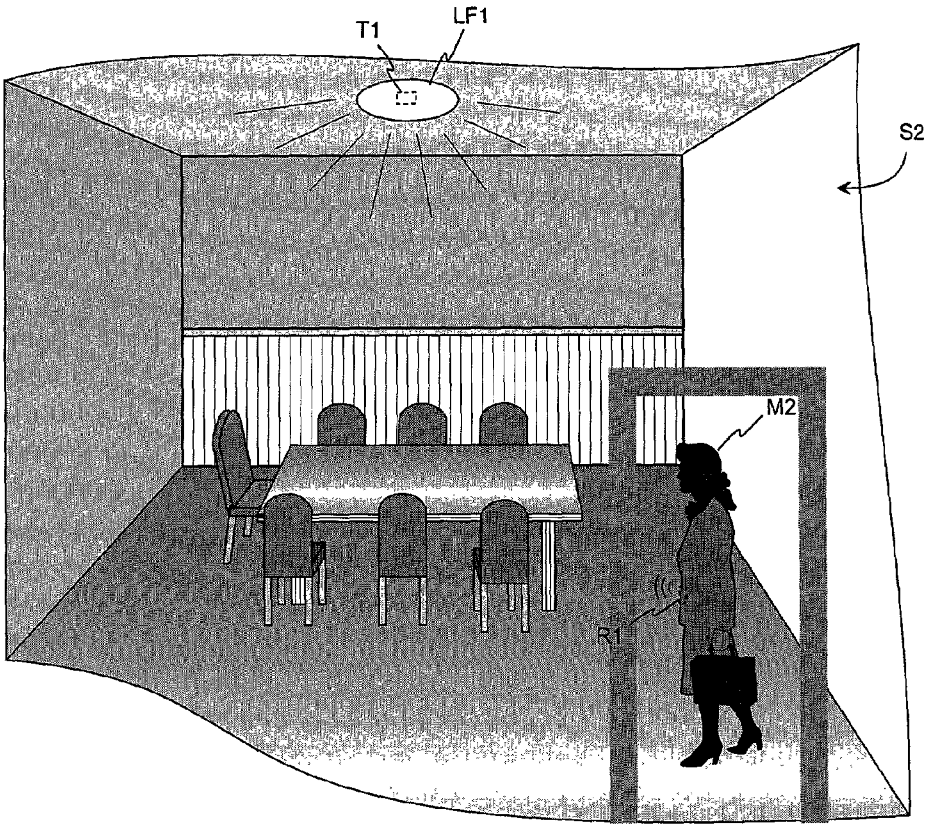
FIG. 2 illustrates an example of a system according to the invention.

FIG. 2 shows an example of the system according to the invention in a operational situation. Figure illustrates a conference room S2, where a person M2 has entered. In the ceiling of the room, there is seen one of the light fittings LF1 in the space. The light fitting LF1 includes a tag transmitter T1 that transmits light with an intensity that fluctuates in a certain way. In the coat pocket of the person M2, there is a mobile phone R1 including a sensitive light detector and a part for analyzing the signal given by the detector. In the situation illustrated in FIG. 2, the analyzing part is capable of inferring the space tag on the basis of the signal given by the detector. As a consequence, for instance the ringing tone of incoming calls is automatically set to silent in the mobile phone, or calls coming to the mobile phone are diverted to a given other number. In FIG. 2, the audio part of the mobile station is steered to give a sound signal. When person M2 lifts the mobile phone in her hand, a message concerning the current space can be read in the display. Naturally the appropriate operation of the light detector is prevented as long as the mobile phone is located for instance in a closed briefcase or underneath thick layers of clothing.

Figure 3:
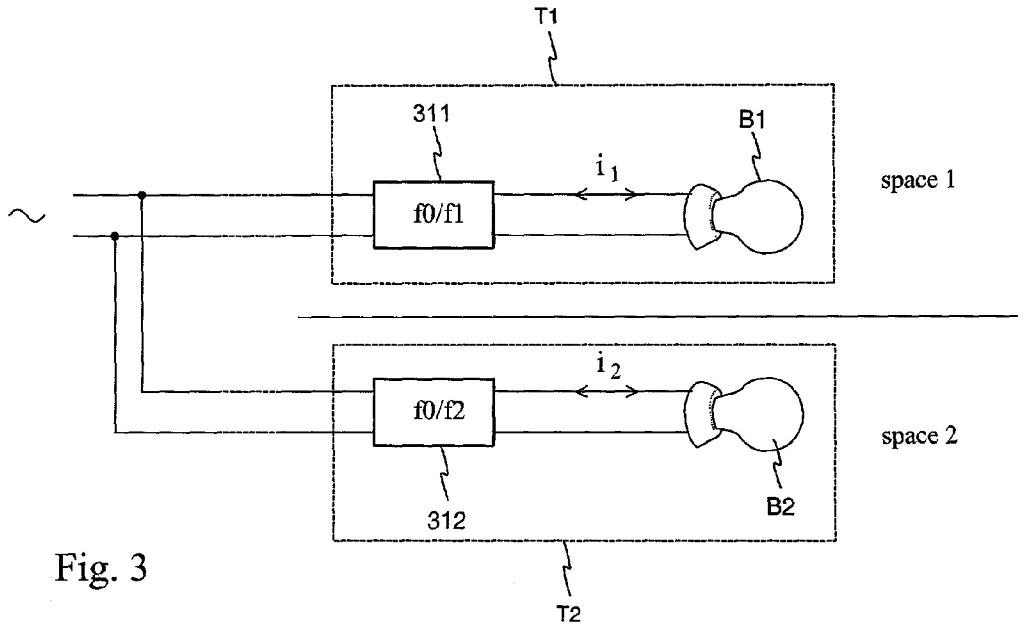
FIG. 3 illustrates an example of a transmitting arrangement according to the system of the invention.

FIG. 3 shows an example of the transmitting arrangement of the system according to the invention. It includes a tag transmitter T1 located in a first space and a tag transmitter T2 located in a second space. The first tag transmitter is provided with a first lamp B1 and with a first frequency converter 311 as a controlling unit of the supply current of the lamp. The first frequency converter changes a frequency f0 used in the mains into a frequency f1, and hence the supply current i1 of the lamp B1 alternates at the frequency f1. Respectively, the second tag transmitter T2 is provided with a second lamp B2 and with a second frequency converter 312 as a controlling unit of the supply current of the lamp. The second frequency converter changes the frequency f0 used in the mains to a frequency f2, which is the frequency of the supply current of the second lamp B2. Consequently, in this example, the space tag is included in the frequency of the alternating intensity of the light emitted by the lamp/lamps provided in the space in question. Several frequencies can be employed according to how many different types of spaces, where the space tag is useful, there are in the premise. In this example, the task of the signal analyzing part of the receiving device is to distinguish the employed frequencies from each other.

Naturally the primary purpose of the lamps B1 and B2 is to illuminate the space. When they simultaneously serve as transmitting components of the tag transmitter, and the frequency converter is an auxiliary component included in the light fitting, a separate tag transmitter is not needed. Neither is there needed a separate power supply arrangement to the transmitter.

Figure 4:
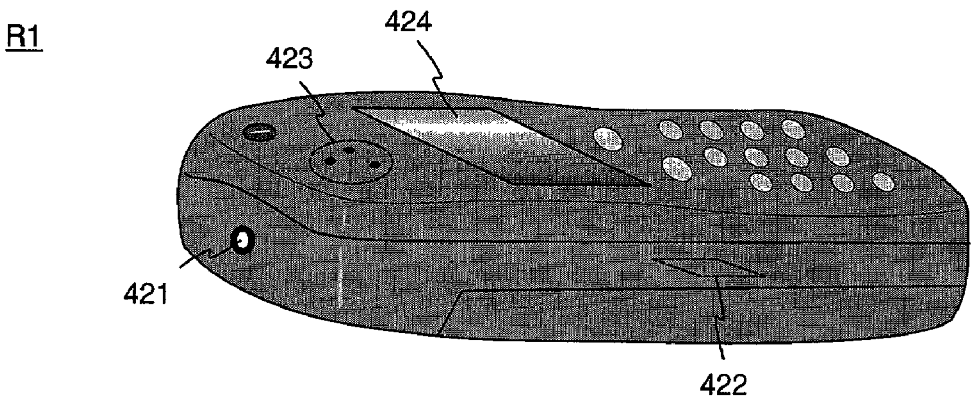
FIG. 4 illustrates an example of a mobile station functioning as a receiver according to the invention.

FIG. 4 shows an example of a mobile phone functioning as a receiver according to the invention. At that end of the phone R1 where a speaker is located, there is provided a light detector 421. Light detectors can naturally be arranged on more than one side of the device. Inside the mobile phone, there is an analyzing part 422 for the signal given by the detector. In addition, there are illustrated a speaker 423 and a display 424 utilized by the space identification system.

Figure 5:
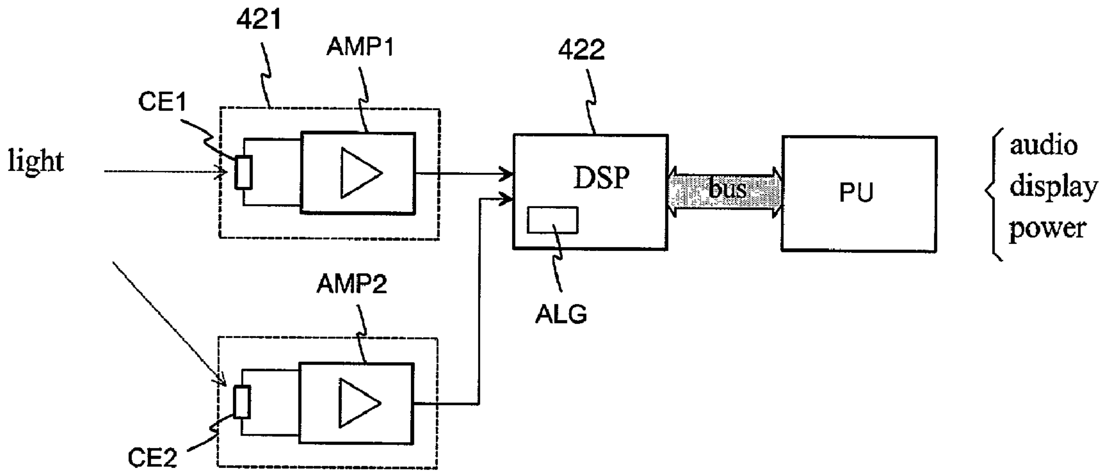
FIG. 5 is a block diagram illustrating the essential elements of a receiver according to the invention.

FIG. 5 is a block diagram illustrating an example of the essential elements of the receiver realized in the mobile phone of FIG. 4. In this example, the number of light detectors is two. The first light detector 421 is composed of a first light sensor CE1 and a first amplifier AMP1 provided in succession thereto. Respectively, the second light detector comprises a second light sensor CE2 and a second amplifier AMP2. The analog signals given by the amplifiers are fed into the signal analyzing part 422, which in this example is a signal processor provided with an analog to digital converter. In addition, the signal processor is provided with a program ALG, which solves a space tag, possibly included in the signal given by the light detectors, by means of a suitable algorithm. If the space tags are generated by means of frequency converters, the algorithm can be a version of FFT (Fast Fourier Transform) or an algorithm realizing a band pass filter. The signal processor is connected to an internal bus of the mobile phone, through which it provides another part of the mobile phone with suitable sequel control according to the solved space tag. In FIG. 5, there is shown a processor unit PU that performs possible automatic tasks, based on the controls given by the signal processor, in order to reduce the activities of the mobile phone, and/or to control the audio part and the display. The selected audio commands and messages to be displayed are stored in the memory of the processor unit PU. Naturally the signal processor can also be arranged to directly perform the required tasks.

In practice, the signal processor can be one of the processors that are in any case in the mobile phone in question, so that part of the processor's capacity is used in the operation according to the invention.

Figure 6:
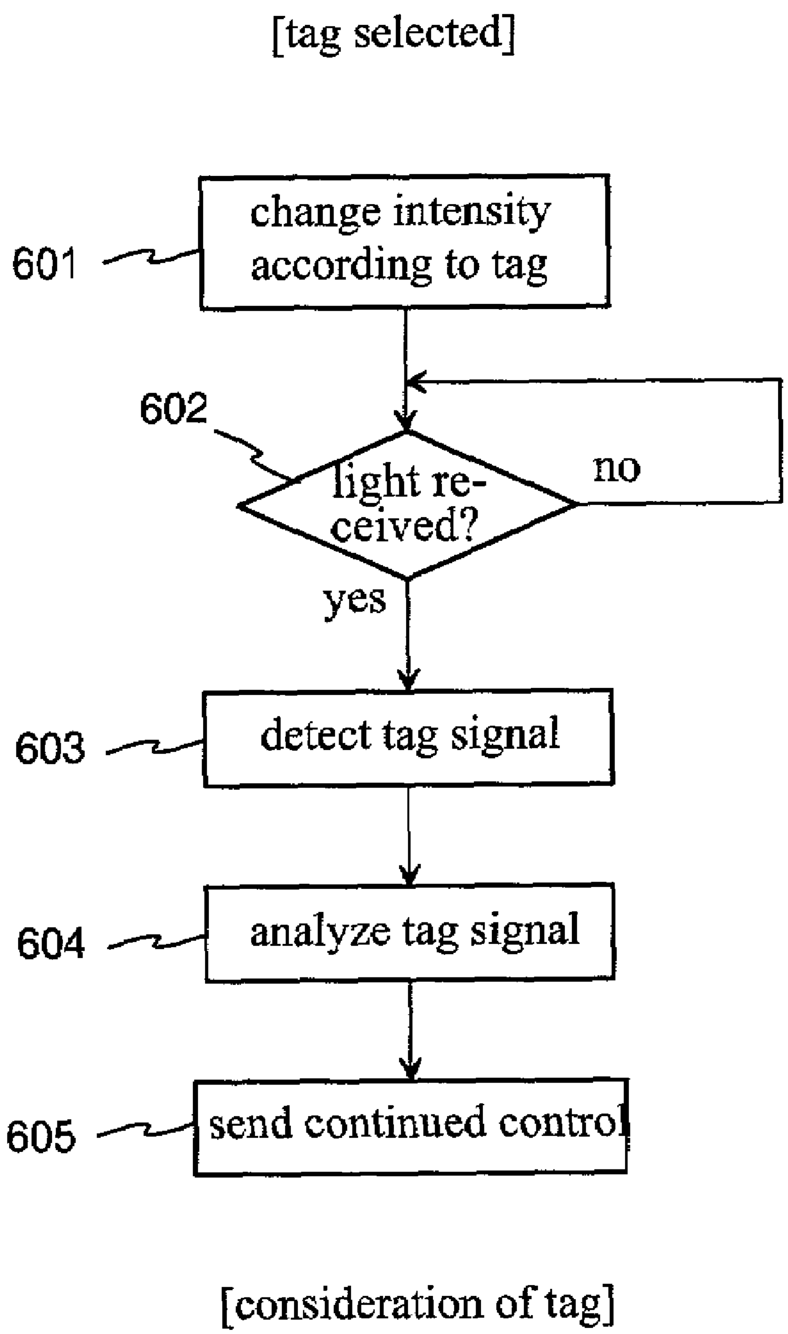
FIG. 6 illustrates an example of a method according to the invention.

FIG. 6 is a flow diagram illustrating an example of a method according to the invention. At step 601, the light intensity of a lamp or lamps serving as a transmitter is changed in a way that corresponds to the space tag in question. This operation is carried out continuously or at given intervals. At step 602 is waited for a receiver to enter the coverage area of the transmission. When this happens, the tag signal included in the light intensity fluctuation is detected in the receiver according to step 603. At step 604, the detected space tag signal is analyzed, and at step 605, a predetermined sequel control corresponding to the space tag is performed in the receiver. Sequel control can for example automatically switch off the mobile station serving as the receiver, or the ringing tone can be silenced. It is likewise possible to give a sound signal and to display an instructive message in the display of the device for the attention of the user.

Above a few preferred embodiments according to the invention are described. The invention is not exclusively limited to these. For example, the tag of the space in question may be stored in the transmitter in the form of a digital word. In that case, the control unit of the lamp's supply current causes, at regular intervals, changes in the lamp intensity according to the bits of the digital word. A single tag can be transmitted for example during a peak of the mains voltage, when the sight is not nearly fast enough to follow the fluctuation of the intensity. If the space tag according to the example of FIG. 3 is included in the frequency of the light intensity fluctuation, the frequency detection in the receiver can also be based on a phase lock technique instead of digital processing. The inventive idea can be applied in different ways within the scope specified in the independent claims 1 and 11.

The invention claimed is:

1. A space identification system for finding out a space information indicating a nature of the space in question, the system comprising at least one space-specific tag transmitter and portable tag receivers, the tag transmitter comprising a lamp, a primary task whereof is to illuminate said space, and a control unit of the lamp supply current to include a space tag in fluctuation of an intensity of light emitted by the lamp, and the receiver comprising at least one light detector and a signal processing part to analyze a signal given by the light detector and to generate a sequel control.

2. A system according to claim 1, said control unit of the lamp supply current comprising a frequency converter, which is arranged to form a certain frequency for the supply current of the lamp.

3. A system according to claim 1, the tag receiver being included in a mobile station and said sequel control being provided for mobile station programs to automatically take the space information into account.

4. A system according to claim 3, said sequel control to automatically take the space information into account being reducing the mobile station activities.

5. A system according to claim 3, said sequel control to automatically take the space information into account being diverting a call to a given number.

6. A system according to claim 1, the tag receiver being included in a mobile station, and said sequel control being provided for an audio part of the mobile station to give a sound alarm to a mobile station user.

7. A system according to claim 5, said sequel control being further provided for a mobile station display to bring a space-related message to a mobile station user.

8. A system according to claim 1, said signal processing part being a signal processor provided with a program operating according to a DSP algorithm.

9. A system according to claim 8, said DSP algorithm being a FFT.

10. A system according to claim 8, said DSP algorithm being an algorithm that realizes a band pass filter.

11. A system according to claim 1, said control unit of the supply current being arranged to change the supply current of the lamp according to bits contained in a defined digital word.

12. A method for finding out a space information indicating a nature of the space in question, in which method space-specific tag signal is sent by a tag transmitter located in the space and the tag signal is received by a portable receiver, the tag transmitter comprising a lamp, a primary task whereof is to illuminate said space, and the receiver comprising at least one light detector and a signal processing unit, and in the method the space-specific tag is included in fluctuation of an intensity of light emitted by said lamp, said fluctuation of the intensity is detected in said light detector of the receiver, a signal given by the light detector is analyzed in said signal processing unit and according to the space information obtained as a result of the signal analysis, a sequel control is sent to another part of the receiver.

* * * * *